United States Patent [19]

Combs

[11] Patent Number: 4,856,756
[45] Date of Patent: Aug. 15, 1989

[54] WELL BOTTOM RELEASE VALVE

[76] Inventor: Linsey L. Combs, Rte. 4, Box 185, Holdenville, Okla. 74848

[21] Appl. No.: 264,366

[22] Filed: Oct. 31, 1988

[51] Int. Cl.$^4$ .................... F16K 31/46; F16K 35/02
[52] U.S. Cl. .................... 251/297; 166/112; 166/332; 251/294; 251/343; 251/348; 137/570
[58] Field of Search .............. 137/570; 166/108, 112, 166/332, 334, 373; 251/297, 340, 343, 347, 348, 294, 321, 322, 324; 417/434

[56] References Cited

U.S. PATENT DOCUMENTS

| | | | |
|---|---|---|---|
| 245,401 | 8/1881 | Raynor et al. | 251/340 |
| 1,354,862 | 10/1920 | Ulrich | 166/334 |
| 1,402,826 | 1/1922 | Anderson | 137/570 |
| 1,601,676 | 9/1926 | Burright | 166/334 |
| 1,687,317 | 10/1928 | Archer | 251/297 |
| 1,802,510 | 4/1931 | Hole et al. | 251/340 |
| 2,944,607 | 7/1960 | Baker | 251/347 |
| 4,103,739 | 8/1978 | Hall | 166/334 |
| 4,595,061 | 6/1986 | Underwood | 166/112 |
| 4,637,471 | 1/1987 | Soderberg | 166/373 |
| 4,691,778 | 9/1987 | Pyne | 166/332 |

FOREIGN PATENT DOCUMENTS 696828 1/1931 France .................... 251/343

Primary Examiner—George L. Walton
Attorney, Agent, or Firm—Richard F. Bojanowski

[57] ABSTRACT

A valve assembly for draining water from a well pipe to facilitate the flushing of the pipe or to reduce its weight when removing the pipe from the well without separating the components of the pumping system which are all securely connected. The valve assembly is positioned in an axial line just above the down hole pipe. The assembly includes a short pipe section having drainage ports. A tight fitting sleeve circumscribes the pipe section. The sleeve is spring biased continually urging the sleeve in a downward or closed position. A means is provided that is connected to the sleeve and extends upwardly to the surface where it may be accessed to manually open and close the ports.

7 Claims, 2 Drawing Sheets

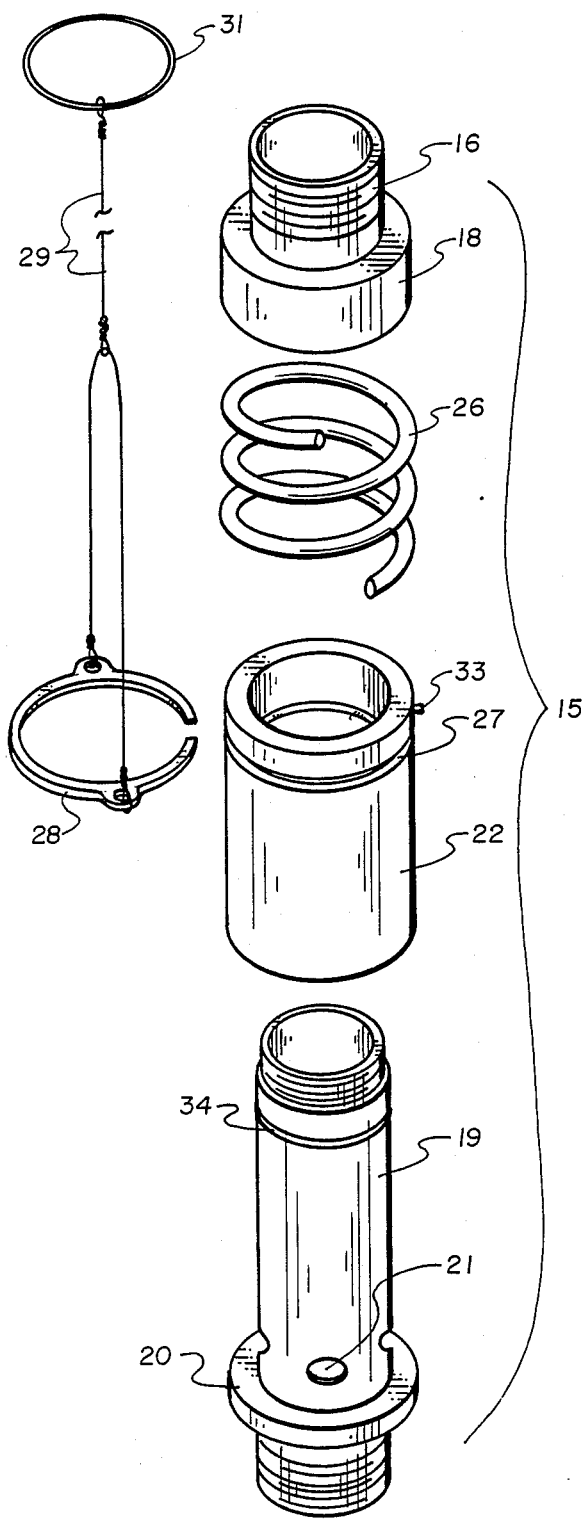
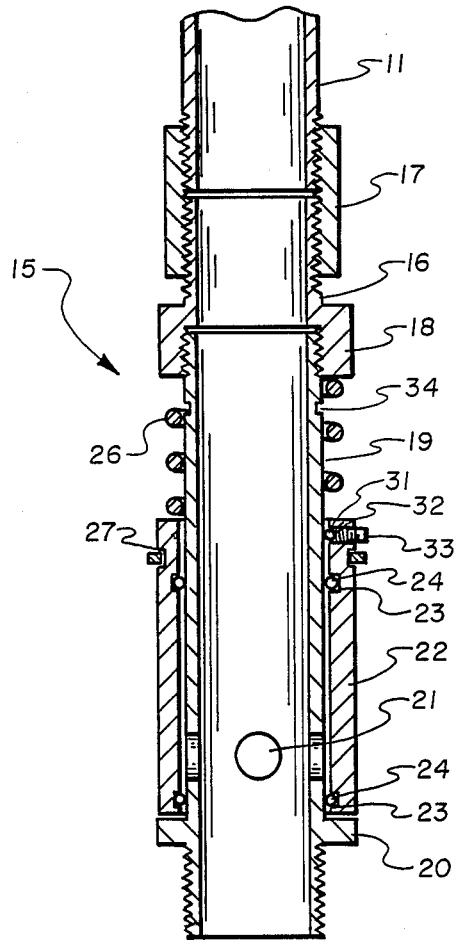
Fig. 3
Fig. 2

WELL BOTTOM RELEASE VALVE

BACKGROUND OF THE INVENTION

This invention relates to a deep well down-hole pumping system and in particular to an improved down-hole water release valve assembly for draining the pipe prior to removing the system from a well.

When problems occur in down-hole pumps, it is necessary to remove both the pump an pipe for repair or replacement of the component parts by pulling the entire system out of a well. Since the pump is at the bottom of the pipe, both are usually filled with water. The water therefore adds a substantial weight to the system. It is a common practice to lighten the load by draining the water from the pipe prior to removal. Many down-hole devices have been proposed to accomplish this. A typical arrangement is to secure the bottom of the delivery pipe to the pump section by a quick disconnect latch. This approach separates the flow from the pump to the pipe and thus allows the pipe to drain. An arrangement like this is disclosed in U.S. Pat. No. 4,595,061 which describes a horizontal drain in the sidewall of the pipe above the pump. The drain leads into a Tee leaving its main line vertical. A slide valve, such as a pipe, is slidably fitted into the Tee. A cable extending from ground level connects to the slide valve so that upon pulling, the drain is uncovered and the pipe drains. The cable may also be connected to the pump to aid in pulling the pump out of the well. Still another prior design is disclosed in U.S. Pat. No. 4,103,739 which shows a delivery pipe above the pump with a telescoping section. The wall of the inner pipe is slotted while the wall of the outer pipe is solid. When the parts are in a collapsed or compressed mode, the slots are closed. When they are extended they are open for drainage. Shear pins hold the parts in a compressed or closed mode during normal use. If a force is applied exceeding the strength of the pins, the pins shear, the slots are uncovered and the pipe is drained. Shoulders are provided to limit travel of the parts whereby, after the slots are uncovered, continued pulling extracts the pipe and pump. The entire assembly must be pulled out of the well in order to close the valve and replace the shear pins.

Other examples of earlier structures that can be found in the prior art are shown in U.S. Pat. Nos. 300,880, 1,213,776, 2,674,200 and 3,292,555.

All of the foregoing are useable, but they have the common disadvantage that upon activation of the release valve, the pump, waterline and valve must be removed from the well in order to reactivate the valve. Thus, the pipe cannot be drained for the sole purpose of flushing the line of sand and other debris or for the purpose of determining whether the pump is functioning properly.

BRIEF DESCRIPTION OF THE INVENTION

It is the primary object of this invention to provide a drain valve on a down hole delivery pipe connected to a pump that may be opened to drain the pipe without breaking the pipe or separating it from the pump. Another object of this invention is to provide a drain valve that can be both opened and closed from the surface. Still another object is to provide a drain valve that can be used to flush the line of debris and then be reset without removing the entire system from the well.

The valve is activated by a simple cable or other draft means extending to ground lever. The cables may also be used as an assist to hoist the drained pipe if removal is desired. The valve is preferably spring loaded to the closed position to assist in closing the valve. The spring in combination with the cable provides for a convenient means for flushing the valve of debris. The device is thus characterized by the fact that the assembly is readied for reuse simply by letting the part move under spring bias with an assist from the cable to a closed position.

The foregoing and probably other less apparent objects of the invention are achieved by providing on the lower end of a down-hole delivery pipe, just above a pump, a ported section of pipe, a sleeve concentrically about said ported section in sliding but sealed relationship therewith whereby, when said sleeve covers said ported section, the ports are closed and when the sleeve is slid away from said ported section, said ports are open thereby to drain away water standing thereabove. For reuse, the sleeve is simply slid back over the ports, by a reverse cable pull in combination with the spring action. In some cases the spring alone will close the ports and use of the reverse cable will not be required. Preferably the valve is adapted with a release means which is capable of locking the sleeve in an upward position, i.e. with ports exposed. After sufficient flushing has been achieved, the cable is again pulled releasing the sleeve so that the ports are closed.

Suitable stops are provided to limit the axial travel of the sleeve so the cable or other suitable draft means can be used to hoist the pipe and pump, after draining, to ground level.

The drain ports desirably have a total cross sectional area greater than the pipe cross-section. This speeds drainage and insures proper flushing.

BRIEF DESCRIPTION OF THE DRAWINGS

FIG. 2 is an enlarged view, partly in section, of the lower portion of the system shown in FIG. 1 with the valve in its closed position.

FIG. 3. is an exploded view of the drain valve assembly embodied in the system shown in FIGS. 1 and 2.

DETAILED DESCRIPTION OF THE INVENTION

Figure 1:
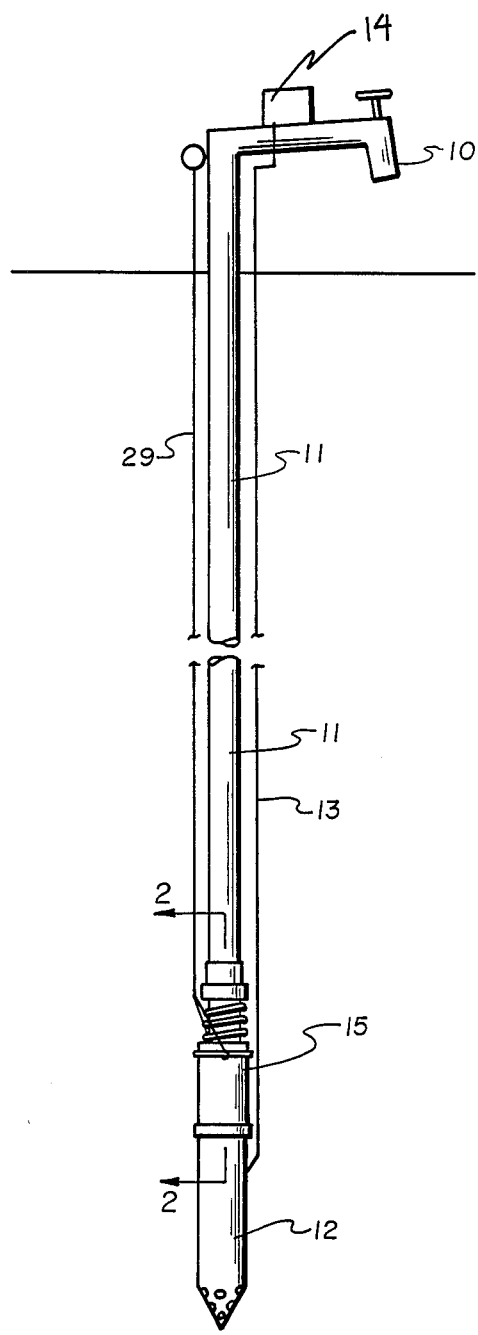
FIG. 1 is a view showing an entire down hole pump system embodying the invention.

FIG. 1 illustrates the invention generally as a complete water pumping system comprising a water outlet 10 located at ground level. The outlet is connected to a vertical pipe 11 which in turn is connected to a down hole pump 12 at the lower end of the pipe 11. The pump is driven by an electric motor (not separately shown) which is connected to a suitable insulated wire 13 and an of-off switch 14 located near the outlet 10.

As is usual in systems of the type described, a check valve is provided in the pump to maintain the pipe filled with water even though the pump is idle.

A valve assembly 15 is provided to drain water from the pipe 11 preparatory to removing the pipe and pump from the well, or to flush the pipe, or to perform diagnostic tests to determine if the pump is faulty.

Figure 4:
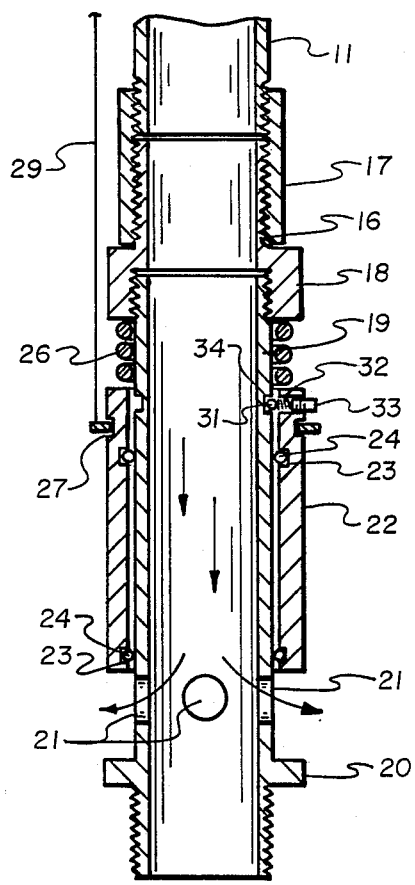
FIG. 4 is a view identical to FIG. 2 except that the valve is in its open position.

As best shown in FIGS. 2, 3 and 4, the assembly comprises an insert 16 threaded at one end into a coupling 17 which in turn is threaded to the bottom of the pipe 11. The insert has an annular flange 18 and is internally threaded to receive a correspondingly threaded short pipe section 19. The pipe section is threaded at its lower end for connection to a pump 12. An annular flange 20 is formed above the threads.

The short pipe section 19 is provided with a plurality of wall openings 21 which may be circular, as shown, or any other appropriate shape.

A snug fitting sleeve 22 is fitted concentrically about on the ported short pipe section 19. It is shorter than the pipe and is sized so that when it is slid to its upper position it uncovers the ports 21. When it is in the lower position it covers the ports. Flange 20 serves as a seat for sleeve 22 when the ports are closed. The sleeve has internal grooves 23 adjacent each end of the sleeve for accommodating suitable "O" rings 24 for sealing against leaks.

A coil spring 26 is mounted concentrically on the upper end of the short pipe section 19. The spring continually urges the sleeve 22 against the flange 20 to insure that the ports 21 remain covered. In other words the valve is spring-biased closed.

A groove 27 located on the outer wall of the sleeve and preferably near the top, is provided to receive a detachable connector 28, which in turn is secured to a cable 29. The cable is suitably guided upwardly in close proximity to the pipe 11 to an actuating handle 31 located at the surface near the outlet 10.

Pulling on cable 29 moves sleeve 22, upward against the spring to uncover ports 21 thus permitting water to drain from the pipe. When the cable is released, the sleeve is forced downward closing the ports. A spring loaded means may also be included to hold the sleeve in an upward position. If desired, a second bifurcated cable (not shown) may be provided to attach to connector 28. This cable extends downward through a pair of cable guides (not shown) located near the bottom of sleeve 22. The cable is guided upwardly to the surface in the same fashion as cable 29. A handle (not shown) may connect to the cable at the surface. By pulling on the second cable, the sleeve is pulled downward and in conjunction with the spring closes the ports.

As shown in FIGS. 2, 3, and 4, the means used for holding sleeve 22 in a locked position and thereby expose ports 21 includes a bored opening 30 located either below or above the upper "O" ring 24. The bored opening is of such dimension that it will hold a ball bearing 31 and a small coiled spring 32. The bearing and spring are contained and held within the bored opening by an allan screw 33. An external groove 34 is cut into the short pipe 19 at a point just below the upper threads to receive ball bearing 31. When the ball bearing enters 34, the biasing action of spring 32 is sufficient to hold the sleeve in a locked upper position, that is a position whereby the ports are exposed. To release the sleeve, the sleeve is pulled upwardly by the cable and released. The increase in downward force created by the further compression of spring 26 is sufficient to force the ball bearing to override or pass over the groove 34 permitting the sleeve to close ports 21. By this type of system it is possible to open and close the valve from the surface by utilizing a single cable. Although the means described and shown in the drawings represents one embodiment of this invention, other systems for exposing the ports and locking the valve in an open position may be used if desired.

In operation, the release valve of this invention is threaded to a pump to be dropped into a well. The other end of the release valve is threaded to sections of a down hole pipe and lowered into a well. After electric motor is energized and the pump primed, water may then be carried through the pipe to the surface for use.

If the down hole pipe, the pump or the release valve must be flushed, the release valve is actuated by pulling on the cable and the ports are exposed. The head pressure created by the water in the pipe is released and the water flows downward and exits through the ports. When all of the water has been released, the cable is again pulled and the spring overcomes the locking means and forces the sleeve downward to close the ports. The electric motor may then be actuated and the down hole pipe filled with water. If the flushing sequence has to be repeated, the valve is again activated permitting water to escape from the pipe through the ports and into the well.

I claim:

1. A valve assembly for draining a liquid from a well pipe comprising a pipe member having a permanently fixed lower flange and a removable upper flange, means for connecting said pipe member above said removable flange to a well pipe, a slidable sleeve circumscribing said pipe member, a coiled spring circumscribing said pipe member and positioned between said removable upper flange and said slidable sleeve to continually urge said sleeve downwardly to sealably enclose a liquid exit port bored in said pipe member above said permanently fixed lower flange and said slidable sleeve when said sleeve is in its maximum upward position, a complimentary spring biased detent functioning locking means including a groove and spring biased bearing means carried in communicable relationship on either said pipe or said sleeve for retaining said sleeve in a locked upward position and an external remote pulling means attached to said sleeve and extending upwardly to a point above ground surface for moving said slidable sleeve upwardly and engaging said locking means and thereby exposing said liquid exit port to permit liquid contained in said well pipe to drain therefrom and to permit said sleeve to be released from said locking means by further pulling said sleeve upwardly and thereby increasing said spring tension force to a degree where it is sufficient to override and bypass any containment of said spring biased bearing in said groove when said pulling means is released and thereby permit said sleeve to return to its normal position and enclose said liquid exit port.

2. The valve assembly of claim 1 wherein said biasing means is a coiled spring.

3. The valve assembly of claim 2 wherein said sleeve has an annular external groove cut therein near the top of said sleeve.

4. The valve assembly of claim 3 wherein said means for slidably moving said sleeve includes a detachable connector which is carried within said annular external groove and an upward extending cable fixed to said detachable connector to pull said sleeve upwardly against said spring and thereby exposing said ports.

5. The valve assembly of claim 4 including an internal groove cut on the inside wall of said sleeve at its top end and bottom end, said grooves being adapted to receive an "O" ring seal.

6. The valve assembly of claim 5 including a pump attached to the lower section of said valve assembly.

7. The valve assembly of claim 6 including a vertical liquid outlet pipe connected to the upper end of said pipe member for carrying a pumped liquid upwardly therethrough.

* * * * *